US009242435B2

(12) United States Patent
Dobecz et al.

(10) Patent No.: US 9,242,435 B2
(45) Date of Patent: *Jan. 26, 2016

(54) LIGHT TRANSMISSIVE BENDABLE WOOD PANEL

(76) Inventors: Gilbert Dobecz, Lakitelek (HU); Zsolt Polk, Kecskemet (HU)

( * ) Notice: Subject to any disclaimer, the term of this patent is extended or adjusted under 35 U.S.C. 154(b) by 945 days.

This patent is subject to a terminal disclaimer.

(21) Appl. No.: 13/362,456

(22) Filed: Jan. 31, 2012

(65) Prior Publication Data

US 2013/0196119 A1  Aug. 1, 2013

(51) Int. Cl.
*B32B 3/00* (2006.01)
*B32B 21/04* (2006.01)
*B32B 21/08* (2006.01)
*B32B 37/00* (2006.01)
*B32B 7/12* (2006.01)
*B32B 21/14* (2006.01)
*B32B 27/30* (2006.01)
*B32B 27/36* (2006.01)
*B32B 3/30* (2006.01)
*B32B 37/12* (2006.01)

(52) U.S. Cl.
CPC . *B32B 21/08* (2013.01); *B32B 3/30* (2013.01); *B32B 7/12* (2013.01); *B32B 21/14* (2013.01); *B32B 27/308* (2013.01); *B32B 27/365* (2013.01); *B32B 37/003* (2013.01); *B32B 37/12* (2013.01); *B32B 2307/412* (2013.01); *B32B 2307/414* (2013.01); *B32B 2307/546* (2013.01); *B32B 2317/16* (2013.01); *Y10T 428/2495* (2015.01); *Y10T 428/24612* (2015.01); *Y10T 428/24802* (2015.01); *Y10T 428/24942* (2015.01)

(58) Field of Classification Search
CPC .............. B32B 1/00; B32B 3/00; B32B 3/30; B32B 21/00; B32B 21/04; B32B 21/08; B32B 21/14; F21V 1/00; F21V 1/26; F21V 15/01
USPC ...................... 428/141, 156, 167, 172, 537.1; 362/351, 361, 362
See application file for complete search history.

(56) References Cited

U.S. PATENT DOCUMENTS

2005/0018433 A1*  1/2005  Gerfers, III ................... 362/351
2010/0304089 A1*  12/2010  Magnusson ................... 428/158

FOREIGN PATENT DOCUMENTS

JP      2002144483 A  *  5/2002
JP      2006240274 A  *  9/2006

OTHER PUBLICATIONS

Machine translation of JP 2002-144483.*
Machine translation of JP 2006-240274.*

*Primary Examiner* — Catherine A Simone
(74) *Attorney, Agent, or Firm* — Olson & Cepuritis, Ltd.

(57) ABSTRACT

A light transmissive bendable wood panel provides a wood panel that may be finished in a similar manner to traditional wood panels, but is light transmissive to allow the light transmissive bendable wood panel to be illuminated. The light transmissive bendable wood panel may be formed with a bendable substrate to allow various curves or other shapes to be formed. The light transmissive bendable wood panel may comprise a face layer having a permeable backing to ensure full adhesion with the substrate. A back layer may be provided to stabilize the light transmissive bendable wood panel and prevent curling, cupping, and delaminating. The light transmissive bendable wood panel may be backlit or edge lit. One or more illuminated designs may be formed in a face layer of the light transmissive bendable wood panel.

12 Claims, 3 Drawing Sheets

LIGHT TRANSMISSIVE BENDABLE WOOD PANEL

BACKGROUND OF THE INVENTION

1. Field of the Invention

The invention relates to wood paneling and in particular to a light transmissive bendable wood panel.

2. Related Art

Wood is a commonly used construction material that is highly versatile. Wood panels or other structures are capable of providing structural support while being aesthetically pleasing. For these reasons, wood panels are often used in both buildings and furnishings. Various processes for finishing wood are used to enhance its appearance.

For instance, wood panels are often painted or stained to various colors. In addition, various clear coatings may be used to alter the texture, feel, or sheen of wood. Though wide ranging in color and sheen, these traditional finishing methods are limited in that they may only change color and sheen of a wood product.

Lighting has also been used to enhance the appearance of wood. For instance, a remote spotlight or accent light may be used to highlight wood structures. In other scenarios, it has been shown possible to illuminate wood by shining a light through the wood.

For example, US Patent Publication No. 2008/0099140 and Hungarian Usage Sample Application No. U 09 00110 disclose a particular paneling product having a thick rigid load-bearing layer to which a wood layer may be attached. A light may shine through the wood layer to illuminate the wood layer. These paneling products may be formed similar to traditional plywood, such as by adhering multiple layers of material together to form a panel.

JP 2006240274 discloses a paneling product where a panel board is located between two panes of glass. Likewise, DE 41 12 097 discloses a panel board between two thick glass panes. Though these products may be illuminated, their panel boards are encapsulated between two panes of glass, thus preventing the panel board from being seen or touched directly. For those desiring a wood panel or structure, this is highly undesirable since the encapsulating glass has entirely different characteristics.

From the discussion that follows, it will become apparent that the present invention addresses the deficiencies associated with the prior art while providing numerous additional advantages and benefits not contemplated or possible with prior art constructions.

SUMMARY OF THE INVENTION

A light transmissive bendable wood panel is disclosed herein. The light transmissive bendable wood panel provides the beauty of a wood panel while being both bendable and light transmissive. The light transmitting capabilities of the light transmissive bendable wood panel allow it to be illuminated. Such illumination may range from a subtle glow to more intense levels of light. The light transmissive bendable wood panel may carry one or more designs or patterns on its face surface and/or may have illuminate designs, patterns, or the like.

The light transmissive bendable wood panel may have various configurations. For instance, in one exemplary embodiment a light transmissive bendable wood panel may comprise a light transmissive bendable non-wood substrate having a planer shape and a first side and a second side, and a face layer made of wood and having a reduced thickness to allow light to pass through. For instance, the face layer, back layer, or both may be a thin wood veneer in one or more embodiments.

A backing may be attached to an inwardly facing side of the face layer. The backing may comprise a planar permeable material. A first adhesive may extend between the bendable substrate and the face layer as well as through the backing to attach the face layer to the first side of the bendable substrate. The backing may help prevent the adhesive from moving as the light transmissive bendable wood panel is formed. This prevents bubbles or gaps from forming in the adhesive thus ensuring a complete bond between the face layer and bendable substrate.

A back layer made of wood may be attached to the second side of the bendable substrate with a second adhesive. The back layer may also have a reduced thickness to allow light to pass through. In this manner, the light transmissive bendable wood panel may be illuminated because light may pass through the light transmissive bendable wood panel from the back layer and then through the face layer to a viewer.

It is contemplated that at least one side of the bendable substrate may be textured to allow for better bonding/adhesion. In addition, the first and second adhesives may be different. For instance a lower viscosity adhesive may be used to attach the face layer to ensure that the adhesive permeates the backing. It is noted that the face layer and the back layer may be different types of wood. The back layer may be a lower cost wood since it may not be visible once the light transmissive bendable wood panel is installed.

One or more depressions may be in the face layer. The depressions generally allow an increased amount of light to pass through the face layer. This allows various patterns or designs to be illuminated on the face layer.

It is noted that the back layer and face layer may have the same thickness to stabilize the light transmissive bendable wood panel. Curling, cupping, or other warping may be prevented in this manner since the face and back of the light transmissive bendable wood panel would expand, bend, and/or contract at the same rate. In addition, the bendable substrate less than or equal to an eighth of an inch.

In another exemplary embodiment, a light transmissive bendable wood panel may comprise a face veneer and a back veneer with the face veneer having a permeable backing, and a substrate between the face veneer and the back veneer. The substrate may be formed from a planer sheet of light transmissive bendable material;

An adhesive may be between the face veneer and the substrate and between the back veneer and the substrate. The adhesive between the face veneer and the substrate may extend through the permeable backing to bond or attach the face veneer to the substrate. One or more depressions may be in the face veneer to allow an increased amount of light to pass through the face veneer.

It is noted that the substrate may be transparent. In addition, the substrate may be a transparent or translucent non-wood material selected such as plastic, acrylic, polycarbonate, and plexiglass. As stated above, a lower viscosity adhesive may be between the substrate and the face veneer, while a higher viscosity adhesive may be between the substrate and the back veneer. The face veneer, backing, substrate, and back veneer may be curved into a curved shape.

At least one light source may be at a peripheral edge of the substrate. At this location, the light source can illuminate the substrate, which in turn will illuminate a face veneer of the light transmissive bendable wood panel.

Various methods relating to the light transmissive bendable wood panel are also disclosed herein. An exemplary method of forming a light transmissive bendable wood panel may comprise providing a face layer and back layer made of wood and having a planer shape, attaching a permeable backing to an inwardly facing side of the face layer, and providing a light transmissive non-wood bendable substrate configured to support the face layer and back layer.

An adhesive may be applied between a back side of a substrate and an inwardly facing side of a back layer of the light transmissive bendable wood panel. Also, an adhesive may be applied between a front side of a substrate and the inwardly facing side of a face layer of the light transmissive bendable wood panel.

The face layer, bendable substrate, and back layer may be compressed together. During compression, the adhesive between the front side of the substrate and the face layer may be held in position by the permeable backing to prevent bubbles or voids from forming in the adhesive. It is noted that compressing the face layer, bendable substrate, and back layer together may comprise compressing face layer, bendable substrate, and back layer together between two plates.

One or more thinner areas or depressions may be formed in the face layer. The thinner areas generally allow additional light to pass through the face layer to allow various designs, patterns, or the like to be illuminated on the light transmissive bendable wood panel. A light source may be secured behind the back layer. In addition, the light transmissive bendable wood panel may be bent or formed around a curved structure, and then fastened to the curved structure.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The light transmissive bendable wood panel herein provides a number of advantages. As will be detailed further herein, the light transmissive bendable wood panel may comprise a bendable substrate, which allows for complex shapes to be formed during installation of the light transmissive bendable wood panel. In one or more embodiments, the light transmissive bendable wood panel also comprises a multi-level decorative layer, which allows for increased and decreased illumination at various areas or portions of the light transmissive bendable wood panel. The light transmissive bendable wood panel also utilizes a plurality of layered materials arranged to extend the life of the panel.

The light transmissive bendable wood panel may be used as a structural and/or decorative item for buildings, furnishings, and other structures. The ability for the light transmissive bendable wood panel to bend increases its versatility greatly, allowing for highly expressive structures to be constructed on site or elsewhere. When illuminated, the light transmissive bendable wood panel may provide a subtle glow, such that the illumination is not readily noticed but clearly there. Of course, the light transmissive bendable wood panel may include or be combined with lighting of various intensities.

Figure 1A:
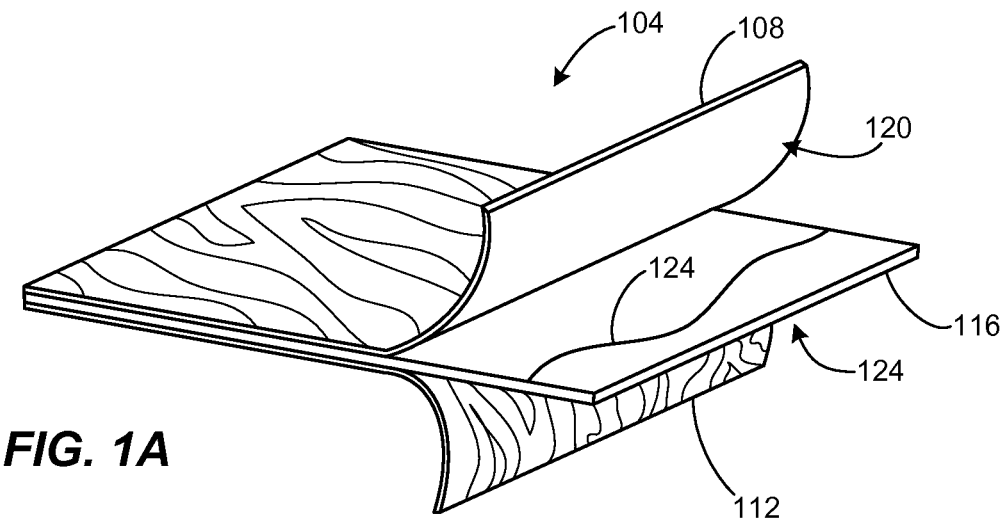
FIG. 1A is a perspective view of a partially assembled light transmissive bendable wood panel.
Figure 1B:
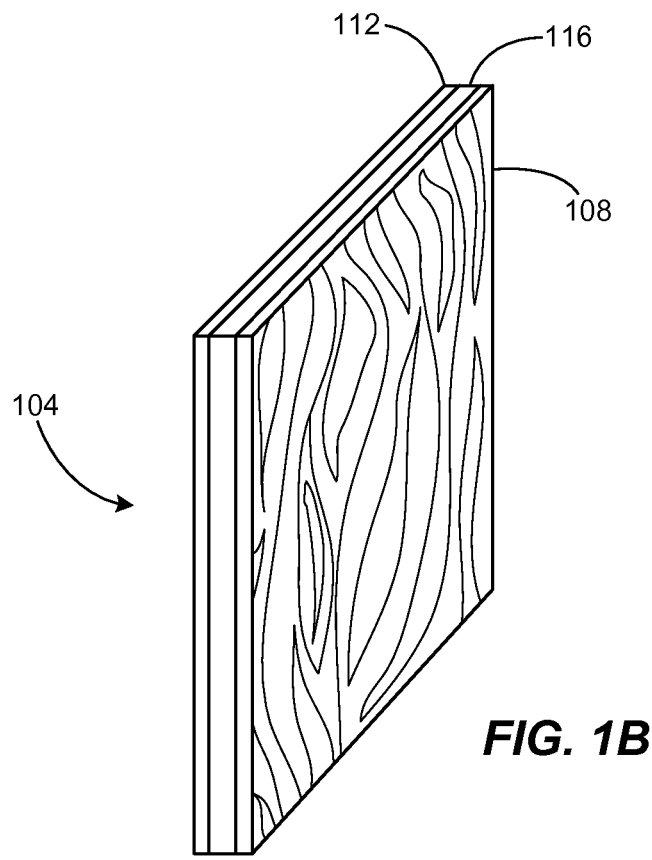
FIG. 1B is a perspective view of an assembled light transmissive bendable wood panel.

The light transmissive bendable wood panel will now be described with regard to FIGS. 1A-1B. FIG. 1A is a perspective view of a partially assembled light transmissive bendable wood panel 104 to illustrate the elements of the light transmissive bendable wood panel. FIG. 1B provides a perspective view of a light transmissive bendable wood panel 104 in its assembled state.

Referring to FIG. 1A and as will now be described, the light transmissive bendable wood panel 104 may have a layered structure, with each layer having its own properties. In one or more embodiments, the light transmissive bendable wood panel 104 may comprise a front or face layer 108 and a back layer 112 supported by a substrate 116. As can be seen, the layers 108, 112 and substrate 116 may be planer in shape so as to form a panel when assembled.

In general, the face layer 108 may comprise a wood panel. Various species of woods may be used. Typically, the face layer 108 will be thin, such as a veneer to allow light to pass through the face layer thus illuminating the face layer. The back layer 112 may also be a wood panel. The back layer 112 may have the same or similar thickness as the face layer 108. In one or more embodiments, the back layer 112 may be formed from the same species or type of wood as the face layer 108. In other embodiments, a different wood may be used.

The back layer 112 is beneficial in that it provides stability for the light transmissive bendable wood panel 104. Since the light transmissive bendable wood panel 104 comprises a variety of flexible materials, the back layer 112 is advantageous in that it balances the expansion and contraction of the face layer 108 thus preventing the light transmissive bendable wood panel 104 from curling or cupping if the face layer 108 were to expand or contract more or less than the substrate 116.

It is noted that because the back layer 112 may be a different type of wood, a less costly wood may be used to stabilize the light transmissive bendable wood panel 104, especially in situations where the back layer is not visible once the light transmissive bendable wood panel is installed.

The substrate 116 generally provides a structure to which the face layer 108 and the back layer 112 may be attached. The substrate 116 may be rigid in some embodiments, but will typically be flexible so as to allow the light transmissive bendable wood panel 104 to bend. In one or more embodiments, the substrate 116 may be constructed of flexible material and/or may have a reduced thickness that allows it to bend while still providing support to the face and back layers 108,112. For instance, it is contemplated that the substrate 116 may be a thin planar shape to allow for bending. In this manner, the light transmissive bendable wood panel 104 may be formed to various curves and other non-linear shapes.

In some embodiments, the substrate's thickness may be set based on the thickness of the face layer 108, back layer 112 or both. For example, the substrate 116 may be the same or a similar thickness as the face layer 108. The substrate 116 could alternatively be a multiple of the thickness of the face layer 108. For example, the substrate 116 may be twice as thick as the face layer 108. In any event, the substrate 116 will typically not be so thick so as to prevent it from being bent or otherwise formed to a variety of slight or severe curves.

Typically, the substrate 116 will be light transmissive. For example, the substrate 116 may be transparent or translucent in one or more embodiments. For instance, the substrate 116 may be plexiglass, acrylic, or the like. In this manner, light emitted behind the light transmissive bendable wood panel 104 may pass through the substrate 116 to illuminate the face layer 108 of the light transmissive bendable wood panel.

It is contemplated that the substrate 116 may be tinted in one or more embodiments. For example, the substrate 116 may have a slight coloring to change the color of light passing through the face layer 108. Various colors may be used. In this manner, the face layer 108 may be illuminated to a desired color. In some embodiments, it is contemplated that the substrate 116 may comprise multiple tinted layers that are selected to produce a particular color of light.

Assembly of the light transmissive bendable wood panel 104 will now also be described with regard to FIG. 1A. In one or more embodiments, the face layer 108 may be attached to a first side of the substrate 116, while the back layer 112 is attached to a second or the opposite side of the substrate. The face and back layers 108,112 may be attached in various ways. For example, in one or more embodiments, the face and back layers 108,112 may be bonded or adhered to the substrate 116, such as with one or more adhesives 124. It is noted that the adhesive 124 is shown as partially covering the substrate 116 in FIG. 1A for illustrative purposes. Typically, the adhesive 124 will fully cover the front and back of the substrate 116 to ensure that the face and back layers 108,112 are fully bonded or adhered to the substrate.

The adhesive 124 may be specially selected for its translucence or transparency. In addition, the adhesive 124 should ideally retain the same translucence or transparency over time to ensure the same level of illumination at the front panel 108 over time. The adhesive 124 will typically also be resilient so as to securely attach the front layer 108 and back layer 112 to the substrate 116 despite them being different materials. This is advantageous in that the substrate 116 may be a smooth surface, such as when the substrate 116 is formed from plexiglass or acrylic material. In some embodiments, the surface of the substrate 116 may be textured to allow the adhesive to better attach to the substrate. However, this will typically change the transparency of the substrate 116, and thus in some embodiments the adhesive 124 may be configured to directly attach a smooth transparent substrate 116 (such as clear plexiglass or acrylic) to the front and back layers 108, 112.

In some embodiments a water-based poly-vinyl acetate based adhesive may be used. The poly-vinyl acetate may be combined with a solvent such as propylene carbonate in some situations to form an adhesive for constructing the light transmissive bendable wood panel 104. Such adhesive bonds the front layer 108, substrate 116, and back layer 112 together despite the different material compositions of these elements of the light transmissive bendable wood panel 104.

During construction, the adhesive 124 may be applied to the front and back of the substrate 116. Alternatively or in addition, the adhesive 124 may be applied to the inward facing side (the side facing the substrate 116) of the face layer 108 and back layer 112. The face layer 108, substrate 116, and back layer 112 may then be compressed or squeezed together to form the light transmissive bendable wood panel 104. A mechanized or other press may be used to compress the face layer 108, back layer 112, and substrate 116 together. The press may utilize flat or planer plates on either side of the light transmissive bendable wood panel 104 to form a planer light transmissive bendable wood panel. FIG. 1B illustrates an exemplary embodiment of an assembled light transmissive bendable wood panel 104. As can be seen, the front layer 108, substrate 116 and back layer 112 have been bonded together to form a planer panel structure.

It is contemplated that the light transmissive bendable wood panel 104 could be formed with one or more curves or other shapes therein, such as by compressing the light transmissive bendable wood panel with a press having plates with a corresponding curved or other shape. For example, curved plates could be used to press the light transmissive bendable wood panel 104 into a corresponding curved shape. It is noted that even curved embodiments of the light transmissive bendable wood panel 104 would remain bendable.

Once the adhesive 124 cures, the light transmissive bendable wood panel 104 may be considered complete. In some embodiments, heat may be applied to cure the adhesive 124 and/or to provide better adhesion or bonding of the face and back layers 108,112 to the substrate 116.

As can be seen from FIG. 1A, the face layer 108 may comprise a backing 120 to ensure desired adhesion or bonding to the substrate 116. This is beneficial at the face layer 108, since any gaps or spaces between the substrate 116 and face layer 108 may be readily visible (since the face layer is typically the decorative or visible layer of the light transmissive bendable wood panel 104). Such gaps, spaces, or other areas of incomplete or improper bonding/adhesion may be somewhat obvious especially when the light transmissive bendable wood panel 104 is illuminated.

In one or more embodiments, the backing 120 may be a thin porous, permeable, or semi-permeable material. In this matter, the backing 120 can absorb the adhesive 124 between the face layer 108 and the substrate 116. This is highly advantageous in that it prevents the adhesive 124 from moving when the light transmissive bendable wood panel 104 is compressed. This ensures that the face layer 108 is fully attached to the substrate 116 across the entire surface of the face layer.

It is contemplated that the backing 120 may be formed from various materials. For example, the backing 120 may be paper in some embodiments. The backing 120 may also or alternatively comprise various natural or synthetic fibers in thin sheets. Typically, the backing 120 will be very thin relative to the face layer 108. This allows the backing 120 to fully bond or adhere the face layer 108 to the substrate 116 without obstructing light transmission. Also, the thinness of the backing 120 helps ensure that the adhesive 124 can permeate or pass through the backing to contact both the substrate 116 and the face layer 108. In one or more embodiments, the backing 120 may be adhered to the face layer 108 with its own adhesive. Alternatively or in addition, the backing 120 may be a separate layer that is adhered by the same adhesive 124 that bonds the face layer 108 to the substrate 116.

It is contemplated that the adhesive 124 used to bond the face layer 108 may be different from the adhesive 124 used to bond the back layer 112 in some embodiments. For example, a first adhesive 124 having lower viscosity may be used to bond the face layer 108 to the substrate 116. This is advantageous in that the lower viscosity helps ensure that the adhesive 124 spreads to fully cover the surface area of the substrate 116 and mating surface of the face layer 108. A second adhesive 124 of higher viscosity may be used to bond the substrate 116 to the back layer 112 since full bonding of the back layer may be less crucial and/or less visible with regard to the back layer 112. Also, it is noted that a backing 120 is typically not provided between the substrate 116 and the back layer 112. It is contemplated that the light transmissive bendable wood panel 104 may have two face layers 108 rather than a face layer and a back layer 112. In such embodiments, the backing 120 may be on both sides of the substrate 116.

Figure 2A:
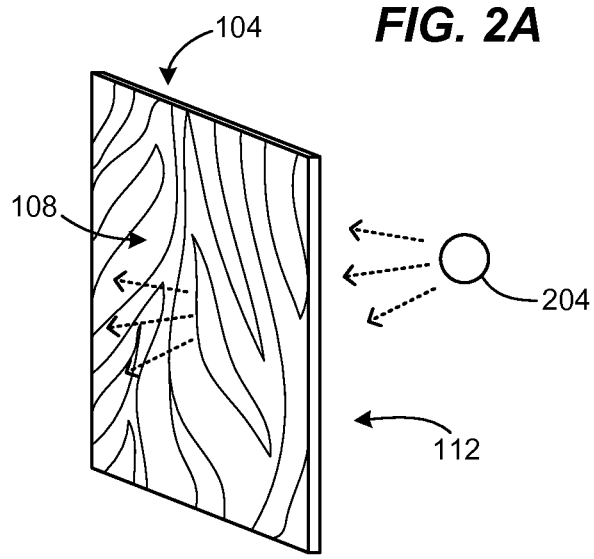
FIG. 2A is a perspective view of a light transmissive bendable wood panel in a planer configuration.
Figure 2B:
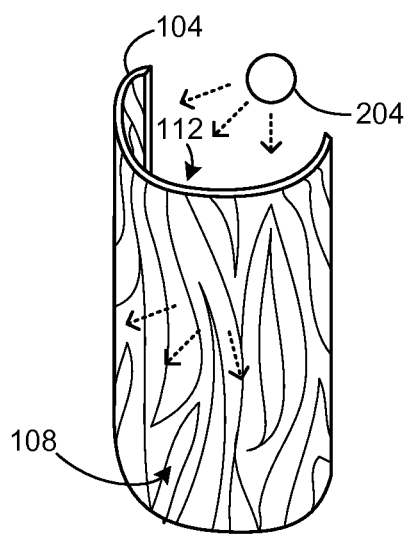
FIG. 2B is a perspective view of a light transmissive bendable wood panel in a curved configuration.

FIGS. 2A-2B illustrate illumination of the light transmissive bendable wood panel 104. FIG. 2A illustrates the light transmissive bendable wood panel 104 in a linear configuration and FIG. 2B illustrates the light transmissive bendable wood panel in a bent configuration. Since the light transmissive bendable wood panel 104 is bendable, it may be formed into a variety of curves and other shapes at a construction site. For example, a carpenter or the like may bend the light transmissive bendable wood panel 104 to conform to a curved frame or other structure and then fasten the light transmissive bendable wood panel to such structure. Various portions of the light transmissive bendable wood panel 104 may be removed or otherwise shaped with woodworking or other tools.

In FIGS. 2A-2B, light (shown by the arrows) passes from the light source 204 through the light transmissive bendable wood panel 104 to illuminate the face layer of the panel 108. The light source 204 generally emits light to illuminate the face layer 108 of the light transmissive bendable wood panel 104. In one or more embodiments, the light source 204 may be positioned behind the light transmissive bendable wood panel 104 so that its light passes through one side of the light transmissive bendable wood panel to emerge at a face layer 108. This illuminates the light transmissive bendable wood panel 104, as shown by the arrows of FIGS. 2A-2B. It is noted that the light transmissive bendable wood panel 104 may also be edge-illuminated in some embodiments. For example, one or more light sources 204 may be positioned at the peripheral edge of the substrate 116. In this manner, the substrate may be illuminated, thus illuminating the face layer 108 as well.

The light source 204 may comprise one or more light emitting devices of various types. For example, the light source 204 may be an incandescent, fluorescent, or LED bulb or the like. In some embodiments, multiple light sources 204 may be used to evenly or otherwise illuminate the face layer 108. It is contemplated that a light source 204 may be dimmable in some embodiments to allow the amount of illumination to be adjusted. The light source 204 may also provide various colors of light and be programmable such as to emit light of one or more colors according to a preprogrammed sequence. A lighting controller may be provided to allow this functionality.

As shown in FIGS. 2A-2B, the light transmissive bendable wood panel 104 may have its face layer 108 illuminated such that it appears to glow. The entire or a substantial portion of the light transmissive bendable wood panel 104 may be illuminated in this manner with the same or similar levels of illumination. In some embodiments, portions of the light transmissive bendable wood panel 104 may be at a higher illumination than others, such as to highlight or accent particular areas of the light transmissive bendable wood panel.

The light transmissive bendable wood panel 104 may be finished similar to traditional wood surfaces. For example, the face layer 108 may be stained with various wood finishing products. In addition or alternatively, the face layer 108 could be painted. For example, a company logo or other design, text or the like could be painted on the face layer 108. It is contemplated that the paint may be opaque so as to not illuminate. Alternatively, the paint may be translucent in some embodiments. The light transmissive bendable wood panel 104 may also be sanded to provide various textures. In addition, various clear or protective coatings may be applied to protect the face layer 108 and/or to give the face layer a particular feel or sheen.

Figure 3A:
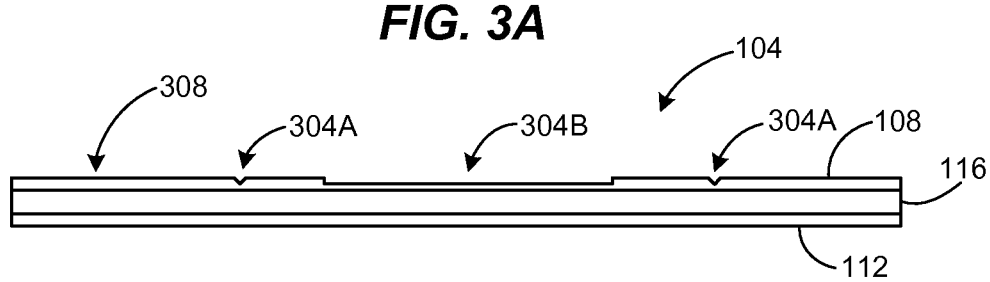
FIG. 3A is a cross sectional view of a light transmissive bendable wood panel.
Figure 3B:
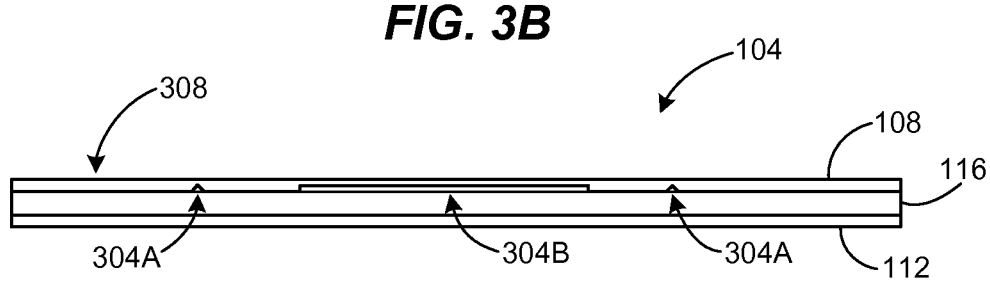
FIG. 3B is a cross sectional view of a light transmissive bendable wood panel.
Figure 3C:
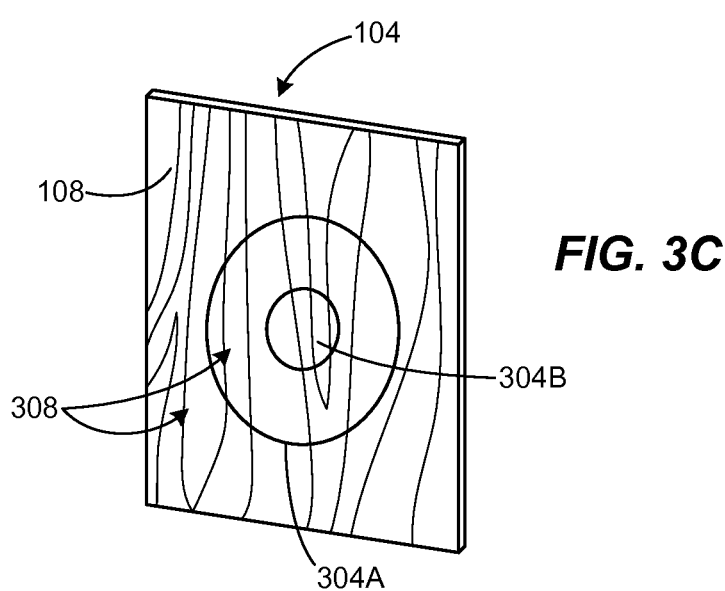
FIG. 3C is a perspective view of a light transmissive bendable wood panel having a design.

It is contemplated that the light transmissive bendable wood panel 104 may also provide illuminated designs in some embodiments. FIGS. 3A-3C illustrate embodiments of the light transmissive bendable wood panel 104 with such capability. FIGS. 3A-3B provides a cross section view of the light transmissive bendable wood panel 104 having the exemplary circular design of FIG. 3C.

Referring to FIG. 3A, it can be seen that the face layer 108 may have multiple elevations so that it is thinner at various areas. For example, the face layer 108 may have various depressions 304, which cause the face layer to be thinner at those locations. The depressions 304 may be formed by stamping or by carving out a portion of the face layer 108. The depressions 304 may have different cross sectional shapes and sizes. For example, depressions 304A have a "V" shape while depression 304B is larger with a rectangular shape. This allows a variety of designs or patterns to be produced. Referring to FIG. 3B, it can be seen that the inner depression 304B forms a circle surrounded by a ring formed by the depression 304A.

One advantage of a multi-elevation configuration is that particular areas of the light transmissive bendable wood panel 104 can allow additional light to pass through to a viewer. Thus, these areas will appear brighter. As can be seen from FIG. 3C, depressions 304 may be carved out or otherwise formed into the face layer 108 to produce various designs, patterns, etc. . . . on the face layer. When illuminated, these designs will have increased illumination and stand out from the surface 308 of the face layer 108. It is contemplated that the "depressions" 304 may extend through the face layer 108 in some embodiments.

Various carving or cutting tools may be used to form the designs, patterns or the like. For instance in some embodiments, cutting blades or tools may be used. In other embodiments, a laser could be used. It is contemplated that the blade, laser, or other tool may be computer controlled or otherwise automated in one or more embodiments. In other embodiments, the depressions 304 may be formed with handheld tools.

Though shown on the outer surface 308 of the face layer 108 in FIG. 3A, the depressions 304 may be formed into the inner surface of the face layer, such as shown in FIG. 3B. This is advantageous in that the outer surface 308 of the face layer 108 remains smooth and thus the design formed by the depressions 304 may be hidden or invisible until the light transmissive bendable wood panel 104 is illuminated. It is contemplated that the light transmissive bendable wood panel 104 may have two face layers 108 in some embodiments, or that the back layer may have one or more depressions 304 therein to provide a illuminated design, pattern, or the like on both sides of the light transmissive bendable wood panel.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A light transmissive bendable wood panel comprising:
   a light transmissive bendable non-wood substrate having a planer shape and a first side and a second side;
   a face layer made of wood and having a reduced thickness to allow light to pass through;
   a backing attached to a inwardly facing side of the face layer, the backing comprising a planar permeable material, wherein a first adhesive extends between the bendable substrate and the face layer and through the backing to attach the face layer to the first side of the bendable substrate; and
   a back layer made of wood attached to the second side of the bendable substrate with a second adhesive, the back layer also having a reduced thickness to allow light to pass through;
   wherein the first and second adhesives are different.

2. The light transmissive bendable wood panel of claim 1, wherein the face layer is a wood veneer.

3. The light transmissive bendable wood panel of claim 1, wherein at least one side of the bendable substrate is textured.

4. The light transmissive bendable wood panel of claim 1, wherein the face layer and the back layer are different types of wood.

5. The light transmissive bendable wood panel of claim 1 further comprising one or more depressions in the face layer, the one or more depressions allowing an increased amount of light to pass through the face layer.

6. The light transmissive bendable wood panel of claim 1, wherein the back layer and face layer have the same thickness to stabilize the light transmissive bendable wood panel.

7. The light transmissive bendable wood panel of claim 1, wherein the bendable substrate less than or equal to an eighth of an inch.

8. A light transmissive bendable wood panel comprising:
   a face veneer and a back veneer, the face veneer having a permeable backing;
   a substrate between the face veneer and the back veneer, the substrate formed from a planer sheet of light transmissive bendable material;
   an adhesive between the face veneer and the substrate and between the back veneer and the substrate, wherein the adhesive between the face veneer and the substrate extends through the permeable backing; and
   one or more depressions in the face veneer, wherein the one or more depressions allow an increased amount of light to pass through the face veneer;
   wherein a lower viscosity adhesive is between the substrate and the face veneer and a higher viscosity adhesive is between the substrate and the back veneer.

9. The light transmissive bendable wood panel of claim 8, wherein the substrate is transparent.

10. The light transmissive bendable wood panel of claim 8, wherein the substrate is a transparent or translucent material selected from the group consisting of plastic, acrylic, polycarbonate, and plexiglass.

11. The light transmissive bendable wood panel of claim 8, wherein the face veneer, backing, substrate, and back veneer are curved into a curved shape.

12. The light transmissive bendable wood panel of claim 8 further comprising at least one light source at a peripheral edge of the substrate, the light source configured to illuminate the substrate.

* * * * *